J. J. FLEMING.
COMBINATION AGRICULTURAL IMPLEMENT.
APPLICATION FILED JAN. 18, 1917.
1,246,577. Patented Nov. 13, 1917.
2 SHEETS—SHEET 1.
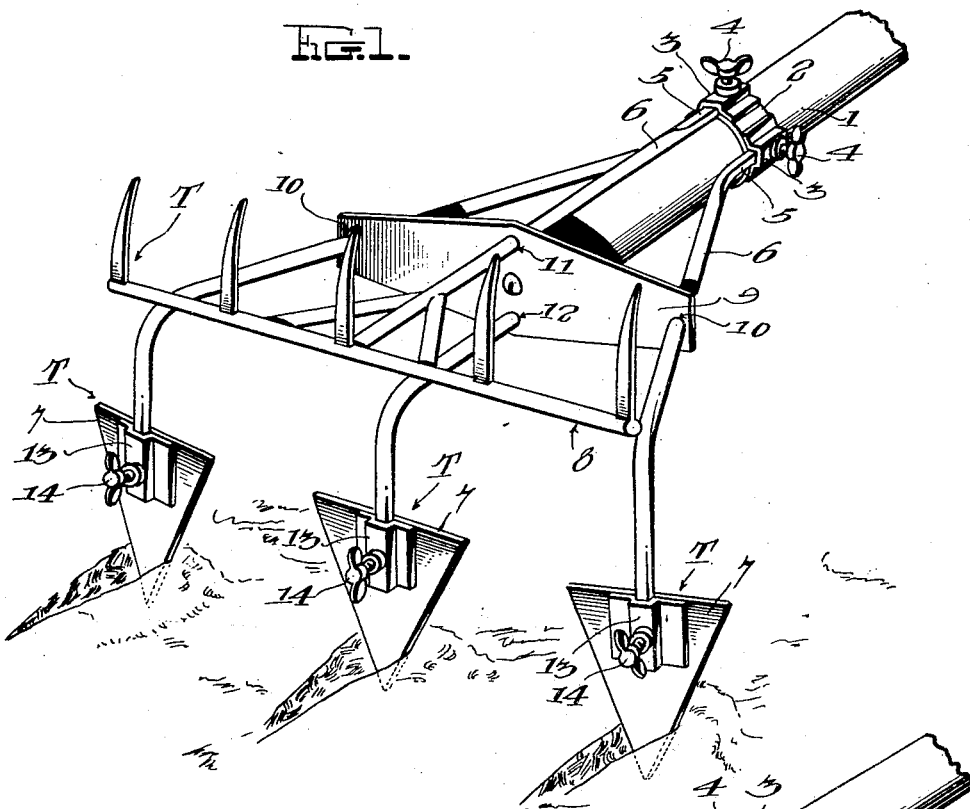
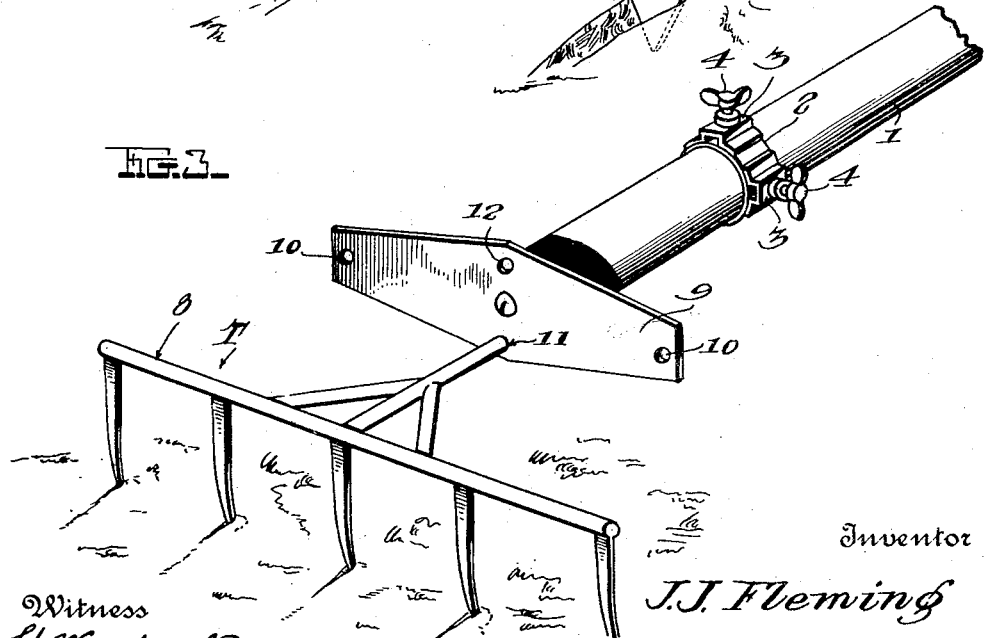
Witness
H. Woodard
Inventor
J. J. Fleming
By H. B. Wilson & Co.
Attorneys

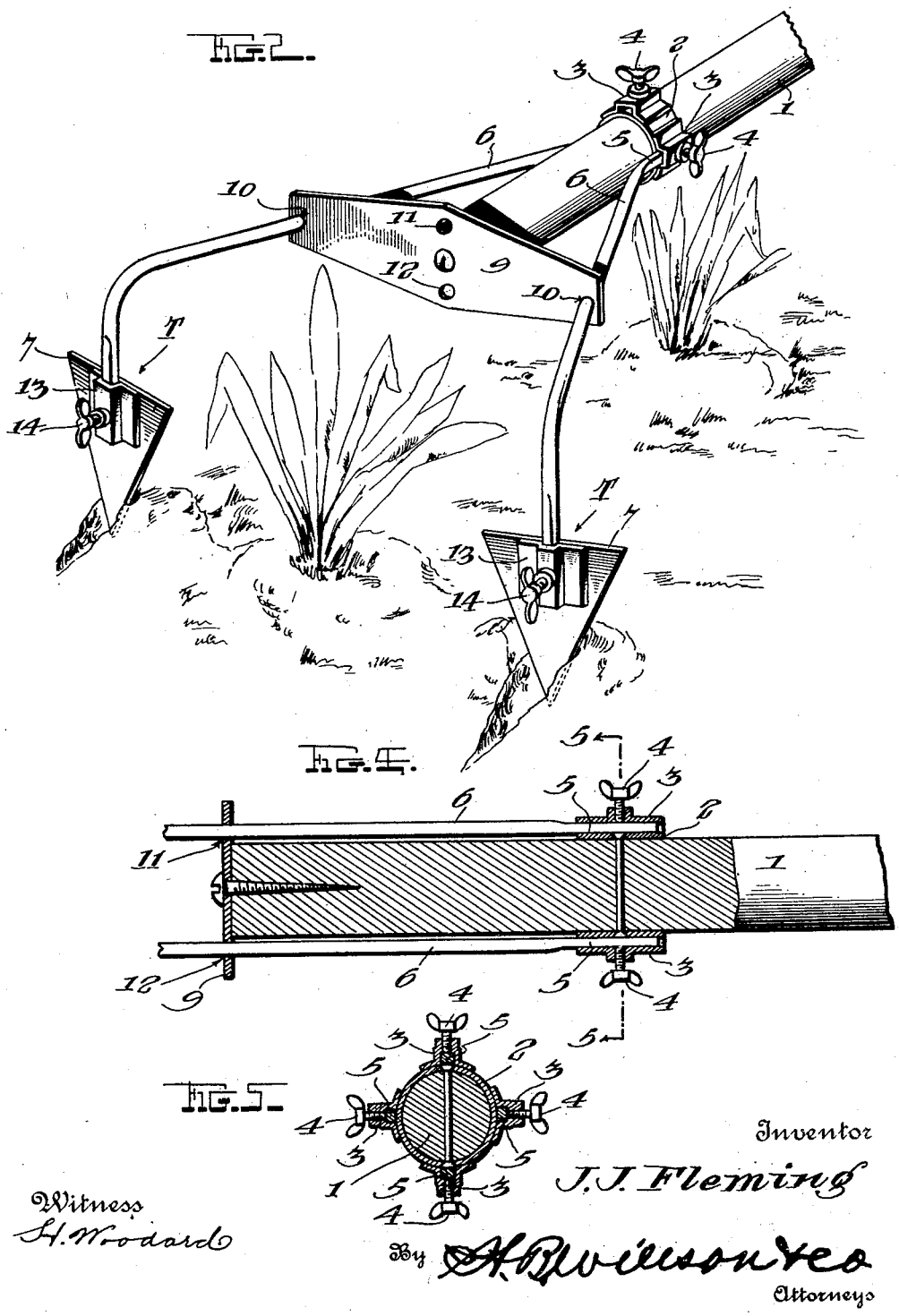

UNITED STATES PATENT OFFICE.

JOSEPH J. FLEMING, OF BOONE, IOWA.

COMBINATION AGRICULTURAL IMPLEMENT.

1,246,577.  Specification of Letters Patent.  Patented Nov. 13, 1917.

Application filed January 18, 1917. Serial No. 143,142.

*To all whom it may concern:*

Be it known that I, JOSEPH J. FLEMING, a citizen of the United States, residing at Boone, in the county of Boone and State of Iowa, have invented certain new and useful Improvements in Combination Agricultural Implements; and I do declare the following to be a full, clear, and exact description of the invention, such as will enable others skilled in the art to which it appertains to make and use the same.

This invention relates to improvements in garden implements, particularly those provided with a number of different kinds of earth-working tools.

The principal object of the invention is to provide an efficient means for mounting the various forms of earth-working tools so as to produce an improved combination implement.

An additional object is to provide a tool having means whereby the earth-working tools may be interchanged at the will of the user.

With this and other objects in view, the invention resides in the novel features of construction, combination, and arrangement of parts which will be hereinafter more particularly described and claimed.

In the accompanying drawings:

Figure 1 is a perspective view of my improved garden implement, all of the earth working tools being in position;

Fig. 2 is a similar view with certain of the tools removed from the handle;

Fig. 3 is still another perspective view showing most of the tools removed, the rake remaining in operative position;

Fig. 4 is a detail vertical longitudinal section through the lower end of the handle; and Fig. 5 is a vertical transverse section taken substantially on the plane of the line 5—5 of Fig. 4.

It will be seen from the accompanying drawings that the invention comprises broadly a handle 1 having means for mounting a plurality of earth-working tools of different kinds thereon. This handle is preferably of wood as with tools of ordinary construction, and at its lower end is provided with a collar 2, the same being of such size that it will snugly fit the handle and is secured thereto in any preferred manner. This collar is spaced a slight distance from the lower end of the handle 1 and carries a plurality, preferably four, elongated sockets 3, the latter being rectangular in cross section. From Fig. 5 it will be noted that these sockets are spaced equal distances around the collar, two being positioned one on each side of the handle and the other two above and below the same.

Each of these sockets is provided with a set screw 4 in order that the rear rectangular ends 5 of the shanks 6 of the earth-working tools T may be securely held against movement within the sockets. Two varieties of tools T are illustrated in the accompanying drawings, one being in the form of a hoe having a preferably triangular-shaped head 7, while the other is in the form of a rake having the usual head 8.

The shanks 6 of the earth-working tools are of such length that they will extend up the handle 1 to the sockets 3 and still have their heads disposed slightly beyond the end of said handle. As above mentioned the rectangular ends of the shanks and the rectangular sockets prevent the tools from turning when being used, the outer end portions of the shanks being securely held against shifting by means of the substantially rectangular elongated plate 9. This plate is secured in any preferred manner to the end of the handle and extends transversely thereof, the outer ends of the plate having apertures 10 while the intermediate portions thereof are formed with apertures 11 and 12. The aperture 11 is formed in the portion of the plate which projects above the handle and is alined with the socket 3 on the upper portion of said handle; the opening 12 is similary positioned below the handle and is alined with the lowermost socket 3. The outer end portions of the shanks of the outer pair of tools T are disposed in the apertures 10, said shanks being positioned at an angle to the handle 1, thus necessitating the end portions 5 being bent laterally so that they may be received in the side sockets 3. The tool having the head 8 may have its shank in either of the apertures 11 or 12 and the corresponding socket therefor, but it is normally disposed in the first mentioned aperture. It will thus be noted from the drawings that the ends of the heads 7 extend in opposite directions to the teeth of the rake head 8.

The heads 7 are adjustable on the outer ends of the shanks 6, said shanks being rectangular in cross section and disposed in rectangular sockets on these heads, said sockets being designated by the numeral 13. Set screws 14 secure the heads in adjusted positions on the shank.

If necessary or desirable the earth-working tools provided with the heads 7, which are in effect hoes, and the tool having the rake head 8, may be simultaneously carried by the handle 1, and one side of the tools may be readily used without interfering with the other since as above mentioned the active ends of the heads thereof extend in opposite directions. When, however, it is not desired to use the rake, the same may be readily removed from the handle by merely loosening the set screw 4 holding the same in the socket. Also, various combinations may be formed from the three hoes. For instance, under certain conditions it may be desirable to use all of them, in which case the outermost ones whose shanks are positioned in the apertures 10 and the corresponding sockets, and the third tool which has a straight shank similar to that of the rake is disposed in either of the apertures 11 or 12 and the corresponding sockets. This last mentioned tool also has an adjustable head 7. When it is necessary to cultivate on each side of a row of growing plants, the center hoe is removed, thereby leaving only the two outermost hoes in operation.

From the preceding description it will be seen that a very simply constructed implement has been produced by which various combinations of tools may be formed for use in cultivating different kinds of plants.

I claim:

In an implement of the class described, a handle, a plurality of earth working tools each comprising a head and a shank extending therefrom, a collar surrounding the handle and spaced from the end thereof, a plurality of rectangular sockets carried by said collar, each of said sockets being provided with a set screw, and an elongated plate secured to the end of the handle and extending transversely thereof, the ends of said plate being each provided with an aperture to receive the outer end portions of the shanks of said tools, the inner end portions of said shank being rectangular in cross section and disposed in said sockets on the collar.

In testimony whereof I have hereunto set my hand in presence of two subscribing witnesses.

JOSEPH J. FLEMING.

Witnesses:
AGNES PETERSON,
MARIE MAHONEY.